United States Patent [19]

Kinoshita et al.

[11] Patent Number: 5,215,923
[45] Date of Patent: Jun. 1, 1993

[54] METHOD FOR AUTOMATIC SAMPLE POSITIONING

[75] Inventors: Ryoichi Kinoshita; Shoji Komaya, both of Tokyo, Japan

[73] Assignee: Seiko Instruments Inc., Tokyo, Japan

[21] Appl. No.: 792,276

[22] Filed: Nov. 18, 1991

[30] Foreign Application Priority Data

Nov. 16, 1990 [JP] Japan .................................. 2-310274

[51] Int. Cl.$^5$ .............................................. B25J 9/16
[52] U.S. Cl. ......................................... 436/47; 436/48; 414/225; 414/783; 901/31
[58] Field of Search ............... 414/226, 783, 786, 225; 436/47, 48; 901/6, 31, 39

[56] References Cited

U.S. PATENT DOCUMENTS

| | | | |
|---|---|---|---|
| 4,557,655 | 12/1985 | Berg | 414/226 |
| 4,598,456 | 7/1986 | McConnell | 414/786 |
| 4,715,773 | 12/1987 | Parker et al. | 414/786 |
| 4,731,223 | 3/1988 | Wakatake | 436/47 |
| 4,843,712 | 7/1989 | Hellstern | 414/783 |
| 4,876,204 | 10/1990 | Inoue et al. | 436/48 |
| 4,927,545 | 5/1990 | Roginski | 436/48 |

FOREIGN PATENT DOCUMENTS 0193016 10/1986 European Pat. Off. .............. 436/48

*Primary Examiner*—James C. Housel
*Assistant Examiner*—Ramon Torres
*Attorney, Agent, or Firm*—Spensley Horn Jubas & Lubitz

[57] ABSTRACT

A method for conveying a sample container from a sample tray which has a designated location for supporting the container. The container is placeable on the tray at a location separated from the designated location such that the container will have an orientation which differs from a desired orientation. The method includes the following steps executing sequentially disposing a robot mechanism having a plurality of grasping fingers above the tray so that the fingers surround the designated location; executing a first robot mechanism operation for moving the fingers horizontally toward the designated location so that the fingers grasp the container and locate the container at the designated location; executing a second robot mechanism operation for moving the fingers horizontally away from the container to leave the container on the tray at the desired location and with the desired orientation; and executing a third robot mechanism operation for moving the fingers horizontally toward the container so that the fingers grasp the container while the container has the desired orientation.

20 Claims, 5 Drawing Sheets

SIDE VIEWS

FIG. 1(a)
FIG. 1(b)
MOTIONS OF THE ROBOT FINGERS
SIDE VIEWS
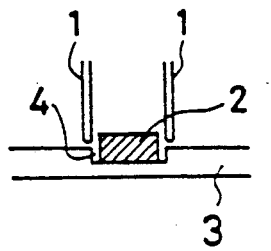
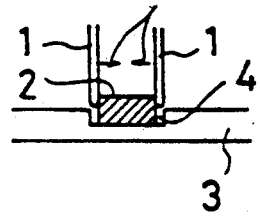
FIG. 1(c)  FIG. 1(d)  FIG. 1(e)
SIDE VIEWS
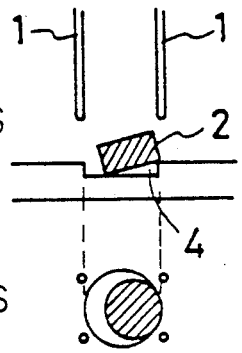
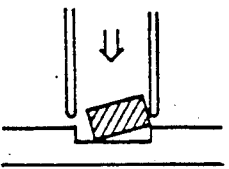
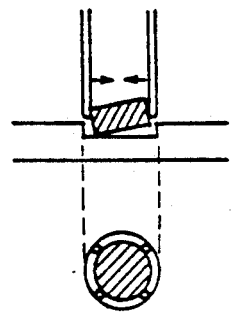
PLANE FIGURES
FIG. 1(f)  FIG. 1(g)  FIG. 1(h)
SIDE VIEWS
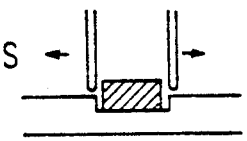
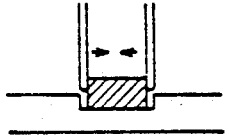
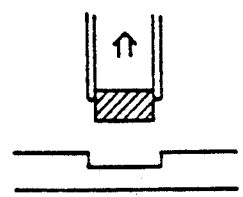
FIG. 1(i)  FIG. 1(j)
PLANE FIGURES
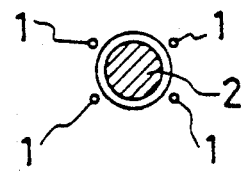
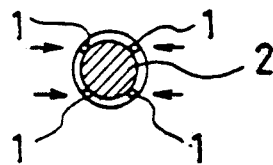

FIG. 2(a)  FIG. 2(b)  FIG. 2(c)
SIDE VIEWS
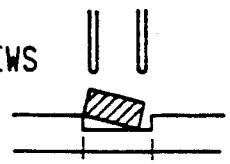
PLANE FIGURES
2
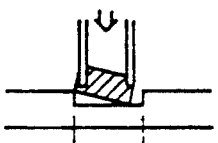
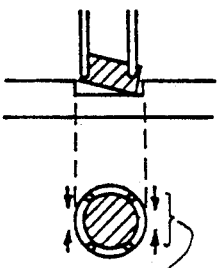
DIRECTIONS IN WHICH THE ROBOT FINGERS CATCH THE CONTAINER
MOTIONS OF THE ROBOT FINGERS CATCH THE CONTAINER
FIG. 2(d)  FIG. 2(e)  FIG. 2(f)
SIDE VIEWS
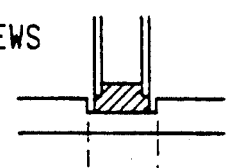
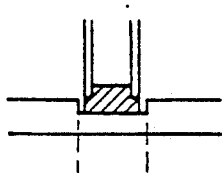
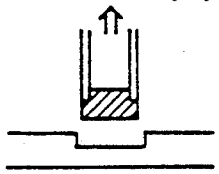
PLANE FIGURES

DIRECTIONS IN WHICH THE ROBOT FINGERS CATCH THE CONTAINER
FIG. 4(a)  FIG. 4(b)
SIDE VIEWS 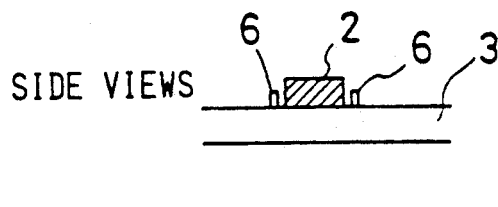 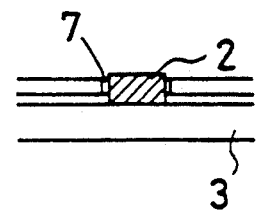
FIG. 4(c)  FIG. 4(d)
PLANE FIGURES 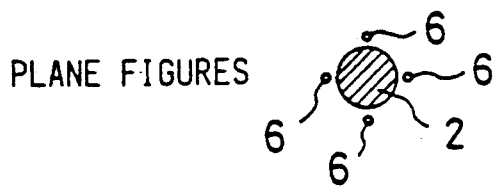 

METHOD FOR AUTOMATIC SAMPLE POSITIONING

BACKGROUND OF THE INVENTION

The present invention relates to an automatic sample positioning mechanism of an analyzer.

Conventionally, the method shown in FIGS. 6(a)-6(d) is used to grasp a sample container for automatic sampling. In FIG. 6(a), robot fingers 1 for picking up a container 2, previously placed on a sample tray 3, descent to a predetermined position low enough to grasp container 2, shown in FIG. 6(b), and the tips of robot fingers 1 close like a pair of tweezers and grasp the container as shown in FIG. 6(c). Then, referring to FIG. 6(d), the robot fingers raise and carry the container while grasping the container, and place the container in the sample container position inside the analyzer.

Thermal anzlyzers such as DSC, DTA, and TG are typical examples of the analyzers using these kinds of containers. Generally, many of the containers used for exterior form. On the other hand, the technology which is generally used in that a robot mechanism is installed in these analyzers for automatic sampling in order to automate the process of placing the sample container in the analyzer. In this technology, a plurality of the sample containers 2 are prepared beforehand and placed on the sample tray 3, and the robot mechanism carries and exchanges the containers one after another.

Though the containers are generally placed on the sample tray 3 manually the containers 2 placed on the sample tray 3 are grasped by the robot fingers 1 of the robot mechanism, so that the containers should be placed manually in predetermined positions. Therefore, it is a common practice to provide a cavity of suitable size for each sample container on the sample tray. This makes it easier to place sample containers 2 in predetermined positions on the sample tray manually, and prevents the sample containers 2 from deviating from the predetermined positions easily as a result of movement of the sample tray 3.

As shown in FIG. 1(c) and FIG. 2(a), however, when a sample container 2 is placed manually on a sample tray 3, the position of sample container 2 sometimes deviates slightly from the center of the cavity in the sample tray 3 and is placed obliquely to the surface of the sample tray 3.

In the above case, when robot fingers 1 of an automatic sampler grasp the sample container 2 by the conventional method, the robot fingers 1 often pick up and carry the sample container 2 while it continues to be oriented obliquely. There is thus the drawback that if the sample container is carried in the above condition, there is a strong possibility that the robot fingers will drop the sample container 2 while carrying it. Accordingly the sample container 2 is placed in the analyzer at a distance from the desired position.

SUMMARY OF THE INVENTION

It is an object of the invention to provide an improved automatic sample handling mechanism for a thermal analysis instrument.

Another object of the invention is to provide an improved automatic sampling mechanism which adjusts the position of the sample container on the sample tray with precision.

The above and other objects are achieved, according to one embodiment of the present invention, by a method for conveying a sample container from a sample tray which has a designated location for supporting the container, the container being placeable on the tray at a location separated from the designated location such that the container will have an orientation which differs from a desired orientation, comprising, in the following order: disposing a robot mechanism having a plurality of grasping fingers above the tray so that the fingers surround the designated location; executing a first robot mechanism operation for moving the fingers horizontally toward the designated location so that the fingers grasp the container and locate the container at the designated location; executing a second robot mechanism operation for moving the fingers horizontally away from the container to leave the container on the tray at the desired location and with the desired orientation; and executing a third robot mechanism operation for moving the fingers horizontally toward the container so that the fingers grasp the container while the container has the desired orientation.

Other and further objects, features and advantages of the invention will appear more fully from the following description.

One advantage of the operation present invention is that even if the sample container had not been placed properly at the designated location on the sample tray, the robot mechanism can adjust the position of the sample container on the sample tray by grasping it at least twice in succession before it is finally positioned. This eliminates the drawback that conventionally a container which is not placed in a proper position is carried as it is.

BRIEF DESCRIPTION OF THE DRAWINGS

FIGS. 1(a)-1(j) are a series of simplified pictorial views showing the sequence of operations which characterize the present invention.

FIGS. 2(a)-2(f) show the movements performed according to the present invention in somewhat greater detail.

FIGS. 4(a)-4(d) show another way to correctly position the sample container.

DESCRIPTION OF THE PREFERRED EMBODIMENTS

Figure 3:
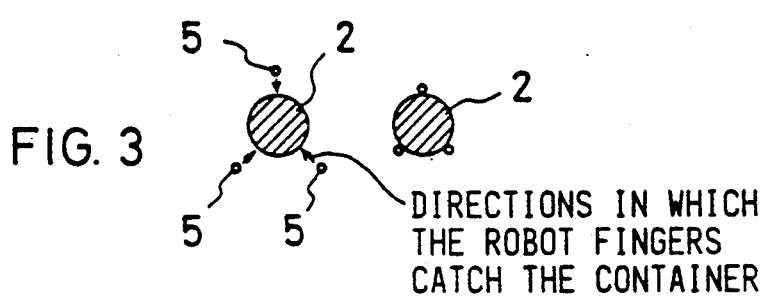
FIG. 3 is a plan view which shows another way to grasp containers with robot fingers.

FIGS. 1(a)-1(j) illustrate a series of the movements according to one embodiment of the present invention and show robot fingers of a robot mechanism for grasping and carrying containers 2. Prior to engagement by fingers 1, container 2 has been placed and arranged manually in a cavity 4 formed in sample tray 3.

FIGS. 1(a)-1(h) are side views and FIGS. 1(i) and 1(j) are plan views. In this embodiment, the robot mechanism has four robot fingers 1 which move in pairs in parallel to grasp and release sample container 2. The sequence of steps is in the order shown in successive views.

FIGS. 1(a)-1(h) are side views of the robot finger 1, the sample container 2, and the cavity 4 on the sample tray.

FIGS. 1(i) and 1(j) show the relation among the positions of each component seen from above. The arrows in the figures show the directions in which the robot fingers move.

FIGS. 1(c)-1(h) show an example of the movements when the benefits of the present invention are realized.

FIG. 1(c) shows that the sample container 2 has been placed a little off center in the cavity in the sample tray so that the container is oriented obliquely to the surface of the sample tray when seen horizontally.

FIG. 1(d) shows the state after the robot fingers 1 have descended, and FIG. 1(e) shows the state when the robot fingers 1 grasp the container 2.

FIG. 1(e) shows that sample container 2 is moved across the sample tray 3 while container 2 is tilted and is then located almost in the center of the cavity 4 on the sample tray if seen from above. In other words, the movement of the robot fingers 1 to grasp the container 2 adjusts the position of the container 2 on the plane to a proper position in the cavity 4.

In the conventional method, robot fingers 1 would carry the container 2 to the analyzer with container 2 oriented as shown in FIG. 1(e).

In the inventive method, however, at this stage the robot fingers 1 open and release the container 2 once more and place it in the cavity 4 again as shown in FIG. 1(f). By the above process, the container 2 which had been placed manually off center of the cavity so that it was tilted is placed by adjustment almost in the center of the cavity, that is the right position. Then, as shown in FIGS. 1(g) and 1(h), the robot fingers 1 grasp the container 2 again and lift and carry it. In other words, when the robot fingers 1 grasp and carry the container 2, the robot fingers repeat the movement of grasping the container 2 twice. With the first movement of grasping and releasing, the position of the container 2 on the sample tray 3 is corrected; with the second movement of grasping, the container placed in the right position is grasped and carried. By the above process, even if the sample container is placed manually a little off center of the cavity provided in the sample tray and tilted in the cavity, the robot fingers 1 relocate the container 2 in the center of the cavity before carrying. Therefore, it never happens that the container is transferred in a tilted condition.

FIGS. 2 also show the movements in the present invention with another example. This example shows the case that the container is placed obliquely and a little aside from the center of the cavity in the direction vertical to the direction in which the robot fingers 1 grasp the container.

Also in this case, as shown in FIGS. 2(a), 2(b), and 2(c), with the movements of the robot fingers 1 to grasp the container 2, the position of the container 2 is adjusted to almost the center of the cavity on the sample tray when seen from above. However, the container 2 remains tilted when viewed horizontally. In the next step, as shown in FIG. 2(d), the robot fingers 1 open again to deposit the container nearly in the center of the cavity, and evenly and correctly. Then, as shown in FIGS. 2(e) and 2(f), the robot fingers 1 close and grasp the container 2, and carry it. Therefore, the inventive method has an effect on adjusting the position of the container and carrying it even when the container is placed a little off the center of the cavity 4 of the sample tray in any direction.

The inventive method is not confined to a mechanism providing the movements of the robot fingers to grasp a container as shown in the embodiments. It is needless to say that the inventive method is effective also for a mechanism provided with at least three robot fingers 5 which move toward a center location, as shown in FIG. 3, to grasp the container. It is also evident that the robot fingers need not be in the shape of poles, or rods, as shown in the embodiments, but the inventive method is available if the robot fingers can adjust the horizontal position of the container by grasping it. The cavity for placing a container in the predetermined position on the sample tray is not confined to a circular one. If the cavity is defined by a concave difference in level for placing the container in a predetermined position, it is possible that the container is manually placed obliquely as shown in the embodiment and the inventive movements are still effective as the embodiments. As shown in FIGS. 4(a)-4(d), a concave recess for placing the container in the predetermined position on the sample tray can be replaced with projections 6 provided on the sample tray 3 for guiding the container, or a through-hole or slit 7 provided on a plate above the sample tray. In that case, the container may be also placed manually away from the right position so as to rest on a projection 6 or against the edge of the hole 7 and placed obliquely, so the inventive movements are still effective as in the preceding embodiments.

Even if the container is placed on a plane sample tray which has no cavity, projection, through hole or slit, the inventive movements are still effective for safely carrying the container, as the container is also adjusted to the right position by the first grasp and carried by the second grasp. It is needless to say that if the movement to grasp the container is repeated at least twice, it has the same effect as shown in FIGS. 2.

Figure 5A:
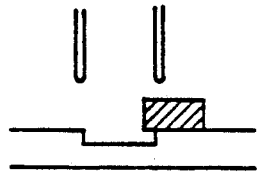
FIGS. 5(a) and 5(b) are respectively a side view and a plan view which show a situation in which the container is in a position where the robot fingers cannot grasp the container.
Figure 5B:
Figure 6A:
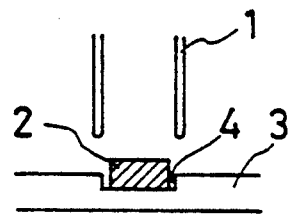
FIGS. 6(a)-6(d) are side views which show the movement of the robot fingers in the conventional method.
Figure 6B:
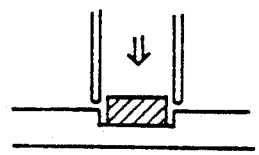
Figure 6C:
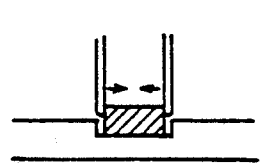
Figure 6D:
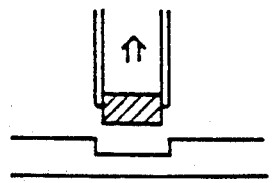
Figures 7A, 7B, 7C, 7D:
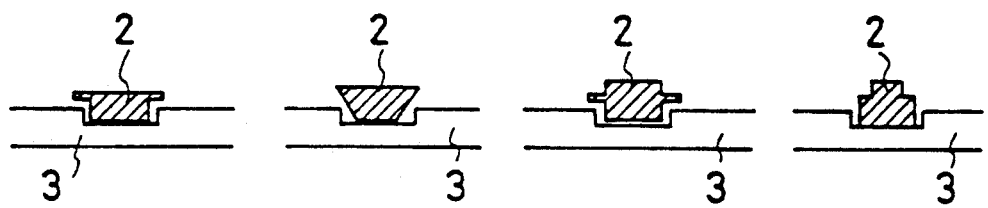
FIGS. 7(a)-7(d) are side views which show other containers that can be transported according to the invention.

In case the container has been placed beyond the range within which the robot fingers can grasp the container, as shown in FIGS. 5a and 5b, the robot fingers cannot grasp the container at all. Therefore, this case is outside of the scope of the present invention. In such a case, generally a detector is provided to detect the condition that the robot fingers cannot grasp the container, and proper measures are taken. In the inventive embodiments, a cylindrical container is assumed for the sake of explanation.

However, if the container has a base for being placed on the plane even if the container is not cylindrical (the shapes shown in FIGS. 7(a)-7(d), for instance), it is possible that the container is placed on the sample tray 3 obliquely to the sample tray. In such a case, the present invention is still effective.

Figures 8A, 8B:
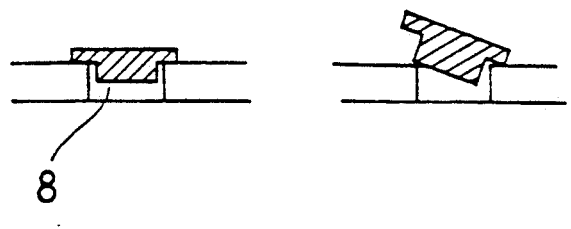
FIGS. 8(a) and 8(b) are side views which further illustrate the practice of the invention.

Further, the method to place the container on the sample tray is not limited to embodiments in which the base of the container 2 touches the sample tray 3 as shown thus far. It is also possible for the container to have flanges, as shown in FIGS. 8(a) and 8(b), which rest on the sample tray 3. On the sample tray 3 is provided a through-hole 8, in which the container is to be placed. In such a case it is also possible for the container 2 to have been placed obliquely to the surface of the sample tray 3, and the present invention is still effective in the same manner as described above.

As mentioned above, the present invention provides that in an automatic sampling mechanism such as an analyzer, the sample container is grasped at least twice when the robot mechanism grasps and carries the sample container from the sample tray. This adjusts the position of the sample container on the sample tray and then the sample container is carried. Therefore, even when the container is placed manually away from the predetermined position, the container is adjusted to the proper position and then carried, thus assuring that the container will not fall during conveyance and will be placed essentially at the desired position in the analyzer.

This application relates to subject matter disclosed in Japanese Application number 2-310274, filed on Nov. 16, 1990, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for grasping a sample container in a sample tray which has a designated location for supporting the container, the container being placeable on the tray at a location separated from the designated location such that the container will have an orientation which differs from a desired orientation, comprising, in the following order:
   disposing a robot mechanism having a plurality of grasping fingers above the tray so that the fingers surround the designated location and the container;
   executing a first robot mechanism operation for moving the fingers horizontally toward the designated location so that the fingers grasp the container and locate the container at the designated location;
   executing a second robot mechanism operation for moving the fingers horizontally away from the container to leave the container on the tray at the desired location and with the desired orientation; and
   executing a third robot mechanism operation for moving the fingers horizontally toward the container so that the fingers grasp the container while the container has the desired orientation.

2. A method as defined in claim 1 comprising the subsequent step of transporting the container to an analyzer.

3. A method as defined in claim 2 wherein the tray has a surface configuration which causes a surface of the container to have a desired orientation when the container is placed at the designated location and an orientation which is tilted relative to the desired orientation when the container is at the location separated from the designated location.

4. A method as defined in claim 3 wherein the robot mechanism has four grasping fingers supported to move toward and away from one another in pairs.

5. A method as defined in claim 3 wherein the robot mechanism has three grasping fingers disposed to move individually toward and away from the center of the designated location.

6. A method as defined in claim 1 wherein the tray has a surface configuration which causes a surface of the container to have a desired orientation when the container is placed at the designated location and an orientation which is tilted relative to the desired orientation when the container is at the location separated from the designated location.

7. A method as defined in claim 6 wherein the robot mechanism has four grasping fingers supported to move toward and away from one another in pairs.

8. A method as defined in claim 6 wherein the robot mechanism has three grasping fingers disposed to move individually toward and away from the center of the designated location.

9. A method as defined in claim 1 wherein the robot mechanism has four grasping fingers supported to move toward and away from one another in pairs.

10. A method as defined in claim 1 wherein the robot mechanism has three grasping fingers disposed to move individually toward and away from the center of the designated location.

11. A method of grasping a container in a tray with a robot having a plurality of grasping fingers, the tray defining a designated location, the container adapted to be placed on the tray at one of the designated location and a location offset from the designated location, the container being oriented at a desired orientation when located at the designated location and at an undesired orientation when located at the location offset from the designated location, the method comprising the steps of:
   positioning the robot above the tray such that the fingers surround the designated location and the container;
   moving the fingers towards the designated location such that the fingers grasp the container and locate the container at the designated location;
   moving the fingers away from the container such that the container remains on the tray in the desired orientation at the designated location; and
   moving the fingers towards the container such that the fingers grasp the container while the container is located at the designated location and is oriented in the desired orientation.

12. A method as defined in claim 11, further comprising the step of:
   transporting the container to an analyzer after the container has been grasped at the designated location while in the desired orientation.

13. A method as defined in claim 12, wherein the tray defines a surface configuration such that the undesired orientation is an orientation in which the container is tilted relative to the desired orientation.

14. A method as defined in claim 13, wherein the robot comprises first and second pairs of grasping fingers, the fingers of the respective pairs adapted to move toward and away from one another.

15. A method as defined in claim 13, wherein the designated location defines a center and the robot comprises three grasping fingers respectively adapted to move toward and away from the center of the designated location.

16. A method as defined in claim 11, wherein the tray defines a surface configuration such that the undesired orientation is an orientation in which the container is tilted relative to the desired orientation.

17. A method as defined in claim 16, wherein the robot comprises first and second pairs of grasping fingers, the fingers of the respective pairs adapted to move toward and away from one another.

18. A method as defined in claim 16, wherein the designated location defines a center and the robot comprises three grasping fingers respectively adapted to move toward and away from the center of the designated location.

19. A method as defined in claim 11, wherein the robot comprises first and second pairs of grasping fingers, the fingers of the respective pairs adapted to move toward and away from one another.

20. A method as defined in claim 11, wherein the designated location defines a center and the robot comprises three grasping fingers respectively adapted to move toward and away from the center of the designated location.

* * * * *